United States Patent
Yamamura et al.

[11] Patent Number: 5,879,429
[45] Date of Patent: Mar. 9, 1999

[54] METHOD FOR PRODUCING HYDROGEN STORAGE ALLOY ELECTRODE

[75] Inventors: Yasuharu Yamamura, Katano; Norikatsu Akutsu, Tokyo-to; Yoichi Izumi, Habikino; Yoshio Moriwaki, Hirakata, all of Japan

[73] Assignee: Matsushita Electric Industrial Co., Ltd., Osaka-fu, Japan

[21] Appl. No.: 827,080

[22] Filed: Mar. 26, 1997

Related U.S. Application Data

[63] Continuation of Ser. No. 411,129, Mar. 27, 1995, abandoned.

[30] Foreign Application Priority Data

Apr. 4, 1994 [JP] Japan ..................................... 6-066155
Dec. 27, 1994 [JP] Japan ..................................... 6-324491

[51] Int. Cl.⁶ .................................. B22F 9/24; H01M 4/04
[52] U.S. Cl. .................................. 75/332; 75/351; 75/370; 420/900; 429/101
[58] Field of Search ............................... 420/900; 95/332, 95/351, 370; 429/59, 101

[56] References Cited

U.S. PATENT DOCUMENTS

| | | | |
|---|---|---|---|
| 4,716,088 | 12/1987 | Reichman et al. | 429/101 |
| 4,728,586 | 3/1988 | Venkatesan et al. | 429/94 |
| 4,837,119 | 6/1989 | Ikoma et al. | 429/206 |
| 5,034,289 | 7/1991 | Yuasa et al. | 429/59 |
| 5,278,001 | 1/1994 | Ono et al. | 420/900 |
| 5,346,781 | 9/1994 | Yuasa et al. | 429/59 |
| 5,492,543 | 2/1996 | Lim | 420/900 |
| 5,529,857 | 6/1996 | Nogami et al. | 429/59 |
| 5,605,585 | 2/1997 | Yamamoto et al. | 420/900 |

FOREIGN PATENT DOCUMENTS

| | | |
|---|---|---|
| Sho 62-117274 | 5/1987 | Japan . |
| Hei 2-51860 | 2/1990 | Japan . |
| Hei 5-101821 | 4/1993 | Japan . |
| Hei 5-343058 | 12/1993 | Japan . |

*Primary Examiner*—George Wyszomierski
*Attorney, Agent, or Firm*—Panitch Schwarze Jacobs & Nadel, P.C.

[57] ABSTRACT

A method for producing a hydrogen storage alloy electrode comprising the step of treating a hydrogen storage alloy by immersing it in an alkaline solution containing cobalt ion or copper ion at a high temperature at a stage wherein the alloy is in powder state before formed into an electrode and/or at a stage wherein the alloy has been formed into an electrode. By this treatment, a hydrogen storage alloy electrode having an excellent high-rate discharge performance at a low temperature is obtained.

16 Claims, 8 Drawing Sheets

METHOD FOR PRODUCING HYDROGEN STORAGE ALLOY ELECTRODE

This is a continuation of Ser. No. 08/411,129 filed Mar. 27, 1995, now abandoned.

BACKGROUND OF THE INVENTION

1. Field of the Invention

The present invention relates to a method for producing a hydrogen storage alloy electrode which employs a hydrogen storage alloy which can absorb and desorb hydrogen gas in a reversible manner.

2. Description of the Related Art

Storage batteries, which are widely used as power sources in a variety of applications, are typically classified into two general groups of lead-acid storage batteries and alkaline storage batteries. Of the two groups, alkaline storage batteries are more reliable, and can be made smaller and lighter. Small alkaline storage batteries are generally favored for portable electric appliances; large alkaline storage batteries have been used mainly in conjunction with industrial equipments.

Some alkaline storage batteries use, for example, air electrode or silver oxide electrode for their positive electrode; however, more commonly nickel electrode is used for the positive electrode. Nickel electrodes have been popular particularly because they were reconfigured from a pocket type to a sintered type for improving their characteristics, and became even more popular with the development of hermetic-sealing.

Cadmium is most commonly used to form the negative electrodes of alkaline storage batteries, although other materials including zinc, iron, hydrogen and the like have also been employed.

There is a considerable commercial interest in the storage batteries that have a higher energy density than the batteries currently available. In an attempt to achieve this goal, researchers have investigated nickel-hydrogen (metal hydride) storage batteries which incorporate hydrogen storage electrodes. There have been made a number of proposals on the production method of the hydrogen storage alloy electrodes using the metal hydrides.

The alloys in these electrodes or the hydrides form of such alloys, can absorb and desorb hydrogen in a reversible manner, and thus the alloys and the electrodes made of these alloys have come to be known as hydrogen storage alloys and hydrogen storage electrodes (or hydrogen storage alloy electrodes), respectively.

Batteries made with hydrogen storage electrodes have a large theoretical energy density as compared with the batteries formed with cadmium electrodes. Also, batteries that employ hydrogen storage electrodes are free from the formation and the subsequent deformation of dendrites, which are problems involved in the zinc electrodes. These advantageous properties of the batteries employing hydrogen storage electrodes, as well as the promising longer service life and the reduction in the environmental concerns inherent to zinc and cadmium containing electrodes/batteries, have encouraged us to develop alloys suitable for the hydrogen storage electrodes, particularly negative electrodes for alkaline storage batteries.

Prior art alloys for hydrogen storage electrodes include multi-component alloys such as those of either the Ti—Ni system alloys, and the La (or Mm)—Ni system alloys (wherein Mm is a misch metal). The multi-component alloy of the Ti—Ni system is classified as an AB type (wherein, A is La, Zr, Ti or an element with a similar affinity for hydrogen, and B is Ni, Mn, Cr or any other transition metal). When this type of alloy is used as the negative electrode in an alkaline storage battery, the electrode exhibits a relatively large discharge capacity during the initial charging and discharging cycles. However, electrodes comprising these alloys do not maintain their large discharge capacity after repeated charging and discharging cycles, i.e., do not have a large saturation discharge capacity.

Another multi-component alloy is of the La (or Mm)—Ni system, which is classified as an $AB_5$ type, wherein A and B are defined as above in relation to the AB type alloy. The alloys of this system have recently been developed in various research projects and thus been regarded as a relatively promising alloy material for the electrodes up to the present. However, the alloys of this system suffer several disadvantages such as relatively small discharge capacity, insufficient service life performances as the electrodes of the batteries, and use of costly materials. Therefore, it is eagerly desired to develop novel alloys from which hydrogen storage electrodes having a large discharge capacity and a long cycle life can be realized.

In order to overcome the above-discussed disadvantages and deficiencies, there has been proposed a method of treating the hydrogen storage alloy powder or the hydrogen storage alloy electrode by immersing it in an alkaline solution.

The conventional method of treating the hydrogen storage alloy powder or the hydrogen storage alloy electrode by immersing it in an alkaline solution is aiming at an acquisition of the following two effects: One is to improve the electrochemical activity of the alloy powder or the alloy electrode by dissolving and oxidizing metal element such as cobalt, manganese or vanadium exposed on the surface of the alloy, thereby increasing the amount of metal nickel (Ni) exposed over the surface of the alloy. The other is directed to the improvement in the battery cycle life or endurance by removing component elements on the surface of the alloy powder or the alloy electrode dissolving in the alkaline solution.

Under the circumstances wherein the nickel-metal hydride storage battery is required to have a more favorable high-rate discharge characteristic and an improved low-temperature high-rate discharge characteristic, it is however difficult to satisfy the above-mentioned requirement only by the prior art alkali treatment of the alloy powder or the alloy electrode. That is, an excessive degree of alkali treatment deviating from an optimum condition undesirably increases the amount of the oxides on the surface of the alloy powder or the alloy electrode, enhances the contact resistance among the alloy particles, and decreases the electrochemical activity of the alloy powder or alloy electrode, thereby deteriorating the battery characteristics.

SUMMARY OF THE INVENTION

In view of the above-mentioned circumstances, the present invention has, as its object, a provision of a hydrogen storage alloy electrode which has excellent electrode characteristics such as discharge capacity, high-rate discharge performance at a low temperature, and the like.

The present invention provides a method for producing a hydrogen storage alloy electrode comprising the steps of subjecting a hydrogen storage alloy powder to a treatment which includes immersing the hydrogen storage alloy powder in an alkaline solution containing at least one kind of ions selected from the group consisting of cobalt ions and copper ions at a temperature of 65° C. or higher, and forming the hydrogen storage alloy powder subjected to the above treatment into an electrode.

The present invention also provides a method for producing a hydrogen storage alloy electrode comprising the step of subjecting an electrode made of a hydrogen storage alloy to a treatment which includes immersing the electrode in an alkaline solution containing at least one kind of ions selected from the group consisting of cobalt ions and copper ions at a temperature of 65° C. or higher.

In a preferred embodiment of the present invention, an electrode is formed by employing an alkali-treated alloy powder and the formed electrode is subjected again to the alkali-treatment.

The alkaline solution containing cobalt ions is prepared by adding cobalt hydroxide, cobalt oxide, cobalt chloride, cobalt nitrate or the like to a caustic alkali solution. The alkaline solution containing copper ions is prepared by adding copper hydroxide, copper oxide, copper chloride, copper nitrate or the like to a caustic alkali solution. In the latter case, it is preferable to add tartaric acid or citric acid to the solution.

Further, it is preferable that the amount of the cobalt ions or the copper ions contained in the alkaline solution is equivalent to the amount of metal cobalt or metal copper of 10 wt % or smaller of the hydrogen storage alloy to be treated.

Moreover, the immersing treatment of the alloy powder or the electrode is preferably performed in a state where the alkaline solution is substantially blocked its contact with oxygen gas, namely, in an inert gas atmosphere or in a state where the air is shut off, whereby a dissolution of oxygen in the solution is effectively suppressed.

The present invention can preferably be applied to a hydrogen storage alloy represented by the general formula $LnNi_xA_y$, wherein Ln represents at least two members selected from the lanthanide elements, and A represents at least one element selected from the group consisting of Mn, Co, Al, Fe, Si, Cr and Cu and wherein $4.5<x+y<5.5$, $3.0<x$ and $0<y<2.5$ are satisfied.

Another preferred hydrogen storage alloy is an alloy represented by the general formula $Zr_{1.2-a}Ti_aMn_wV_xNi_yM_z$ wherein M represents at least one element selected from the group consisting of B, Al, Si, Cr, Fe, Co, Cu, Zn, Nb, Mo, Ta and W and wherein $0 \leq a < 1.2$, $0.1 \leq w \leq 1.2$, $0 \leq x \leq 0.4$, $0.8 \leq y \leq 1.6$, $0 < z \leq 1.2$, and $1.7 \leq (a+w+x+y+z) \leq 2.7$, and the main component of the alloy phase is C14-type Laves phase ($MgZn_2$ structure) or C15-type Laves phase ($MgCu_2$ structure).

Further, another preferred hydrogen storage alloy is an alloy containing Zr or Zr and Ti, and an alloy phase containing Ln and Ni as the main component by 30 wt % or less, wherein Ln represents at least one member selected from the lanthanide elements.

While novel features of the invention are set fourth in the preceding, the invention, both as to organization and content, can be further understood and appreciated, along with other objects and features thereof, from the following detailed description and example when taken in conjunction with the attached drawings.

DESCRIPTION OF THE PREFERRED EMBODIMENTS

Figure 1:
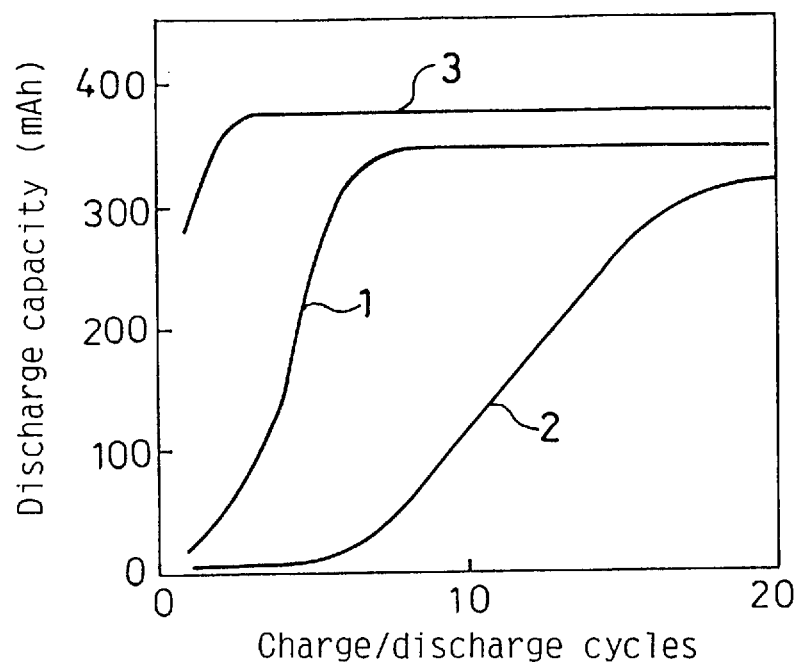
FIG. 1 is a diagram showing the changes in the discharge capacity with the accumulation of charging and discharging cycles of electrodes made of the hydrogen storage alloy powders subjected to various treatments.

As mentioned above, according to the present invention, the hydrogen storage alloy is subjected to an immersing treatment in an alkaline solution containing cobalt ions or copper ions at a high temperature at the stage of alloy powder before and/or after formed into an electrode. During this immersing treatment, the cobalt ion or the copper ion in the alkaline solution is deposited as metal on the surface of the alloy by a redox (oxidation-reduction) reaction with a particular element such as manganese (Mn) or vanadium (V) in the hydrogen storage alloy.

In contrast to this, the prior art alkali treatment has been directed to a production of activation point on the surface of the hydrogen storage alloy by dissolving or oxidizing alkaline-soluble components or alkaline-oxidizable components on the surface of the alloy to expose any electrochemically-active components such as nickel contained in the alloy on its surface, as well as to an acquisition of improved endurance of the alloy in a high temperature alkaline solution by dissolving the soluble components.

In accordance with the present invention, cobalt or copper is deposited on the surface of the alloy by the above-mentioned immersing treatment and the deposited cobalt or copper functions in the following manner. That is, since the metal cobalt per se is electrochemically active, it improves the electrochemical activity of the alloy electrode in a great deal by a synergetic effect (potentiating effect) with the other active metal such as nickel exposed on the surface of the alloy. Further, in place of oxide which has inevitably been formed on the surface by the prior art alkali treatment, copper deposits on the alloy surface and contributes to a reduction in the contact resistance among the alloy particles. By virtue of the above functions and contributions, the high-rate discharge characteristic of the electrode is improved and its discharge capacity is increased.

A certain degree of effect can be expected by the alkali treatment at a temperature around room temperature, though a long period of time is required for the treatment. In order to achieve a high-temperature durability of the battery, it is required to perform the treatment at a high temperature of 65° C. or higher.

Further, it is possible to promote the dissolution of copper hydroxide, copper oxide or the like by adding a compound such as tartaric acid or citric acid which can form a complex ion with the copper ion to the solution used in the alkali treatment.

When the above-mentioned alkali treatment is performed in an atmosphere wherein oxygen in the air dissolves in the alkaline solution in a large quantity, there is an inconvenience that since the dissolved oxygen acts to oxidize the surface of the hydrogen storage alloy and excessively oxidizes the surface beyond a predetermined amount, the once deposited cobalt is dissolved again. In order to avoid the above-mentioned inconvenience, it is advantageous to perform the immersing treatment of the alloy powder or the alloy electrode in a state wherein the alkaline solution is substantially blocked its contact with oxygen.

Moreover, if the amount of the cobalt ion or copper ion in the alkaline solution used in the treatment is large, an amount of the metal nickel or metal cobalt deposited by the treatment becomes excessive, resulting in a decrease of the capacity of the electrode.

In accordance with the present invention, it is possible to produce a hydrogen storage alloy electrode excellent in the electrode characteristics such as discharge capacity and high-rate discharge performance at a low temperature.

In the following paragraphs, examples of the present invention will be described together with comparative preparations by referring to the attached drawings.

EXAMPLE 1

Treatment of Alloy Powders with Cobalt Ion

An alloy powder of the composition represented by the formula $ZrMn_{0.2}V_{0.2}Cr_{0.4}Co_{0.1}Ni_{1.2}$ having an average particle diameter of 45 $\mu$m or smaller was used as Samples of the hydrogen storage alloy.

For 100 g of the alloy powder, 200 ml of a 31 wt % potassium hydroxide (KOH) aqueous solution which contained cobalt hydroxide equivalent to 1 g of metal cobalt was prepared as an alkali treatment solution.

The alkali treatment solution was placed in a container made of a heat-resistant resin and heated to 110° C. Cobalt hydroxide or cobalt oxide as the cobalt ion source may be added to the treatment solution after heated. Then, after the alloy powder was put in the heated alkali treatment solution containing cobalt ion, the container was closed with a lid. The alkali treatment solution was heated by stirring until its cobalt blue color disappeared.

A time point at which the cobalt blue color of the alkali treatment solution disappeared was regarded as an end point, and the solution was cooled and stood still After the supernatant of the solution was removed, the content was washed with water, lowered pH value, filtered, and dried to obtain the alloy powder.

Although the above-mentioned treatment was performed at 110° C., it is possible to shorten the treatment time by adopting a higher treatment temperature.

For comparison, a hydrogen storage alloy which had been subjected to an immersing treatment in a 31 wt % KOH aqueous solution without containing any cobalt ion at the same temperature of 110° C. for the same time period as in the alkali treatment, and another alloy with no alkali treatment were prepared.

(1) Half-Cell Tests

Half-cell tests for evaluating the electrode characteristics as a negative electrode for an alkaline storage battery, in particular, the charging and discharging cycle characteristic by the electrochemical charging and discharging reaction were carried out for the respective alloy samples.

Each 1 g of the above-mentioned alloy sample powders were mixed well with 3 g of carbonyl nickel powder and 0.12 g of polyethylene fine powder, as a conductive agent and a binder, respectively, by stirring, and the obtained mixture was molded into a disk of a diameter of 24.5 mm and a thickness of 2.5 mm. The disk was heated in a vacuum at 130° C. for 1 hour to melt the binder, thereby to produce a hydrogen storage alloy electrode.

By attaching a lead wire made of nickel to each of the hydrogen storage alloy electrodes thus obtained, each of the negative electrodes were produced. As a positive electrode, a sintered-type nickel electrode having an excessive capacity as compared with the negative electrode was used. A polyamide resin unwoven fabric was used as a separator. The above-mentioned positive electrode was combined with the negative electrode by placing the separator inbetween, and the obtained combination was immersed in an electrolyte composed of a potassium hydroxide aqueous solution having a specific gravity of 1.30. These half-cells were subjected to a repeated charging and discharging operations at a constant current, and the discharge capacity was measured for every cycle. The charging and discharging conditions included charging at a current of 100 mA for 1 g of the hydrogen storage alloy for 5 hours and discharging at a current of 50 mA for 1 g until the cell voltage decreased to 0.8 V.

FIG. 1 is a diagram showing the results of the tests. An abscissa in FIG. 1 indicates the number of accumulated charging and discharging cycles and an ordinate indicates the discharge capacity per 1 g of the alloy. The numerals in the diagram indicate the number of the alloy samples. Sample No.1 represents an electrode made of an alloy subjected to the prior art alkali treatment, Sample No.2 represents an electrode made of an alloy without any treatment, and Sample No.3 represents an electrode made of an alloy subjected to the alkali treatment in accordance with this example.

As clearly shown in this diagram, the discharge capacity of Sample No.1 increases gradually from about 20 mAh/g at the first cycle to about 45 mAh/g at the second cycle, and reaches its constant value of about 345 mAh/g at the 8th cycle and thereafter. In contrast, Sample No.2 demonstrates substantially no increase in the discharge capacity until the fifth cycle, and an increase in the discharge capacity is appreciated only at the sixth cycle and thereafter. The discharge capacity of Sample No.2 is however a low value of 320 mAh/g after a lapse of 20 cycles. The hydrogen storage alloy of this example, i.e., Sample No.3 demonstrates a discharge capacity of 280 mAh at the first cycle, 360 mAh at the second cycle and 375 mAh at the 3rd cycle and thereafter, which is substantially a constant high value.

The following are considered to be the causes for the most excellent discharge capacity demonstrated by Sample No.3 of this example. Firstly, since the surface of the alloy has been treated with a high temperature alkaline solution, the alloy is stable for the alkaline electrolyte, and thus contacts between the alloy particles are sufficiently maintained. Secondly, the electrochemical reactivity of the alloy has been improved by cobalt particles formed on the surface of the alloy.

(2) Sealed-Type Battery Tests

Next, sealed-type batteries were configured in order to investigate the battery characteristics.

To each of the above-mentioned alloy sample powders with or without alkali treatment, a dilute aqueous solution of carboxymethyl cellulose was added and mixed well to prepare a paste, which was then filled in a foamed nickel sheet having a mean pore size of 150 $\mu$m, a porosity of 95% and a thickness of 1.0 mm. The filled nickel sheet was dried at 120° C., and compressed by means of a roller press. The surface of the compressed nickel sheet was coated with fluorocarbon resin powder to prepare an electrode.

Each of these electrodes were cut to have a rectangular shape having a width of 3.3 cm, a length of 21 cm and a thickness of 0.4 mm, and two lead plates were attached to the predetermined two points of the respective electrode to form a negative electrode. Each negative electrode was spirally rolled up together with a positive electrode (capacity: 3.0 Ah) and a separator, with the separator disposed between the two electrodes. The cylindrical electrode roll thus obtained was placed in a size SC vessel. A well-known foamed nickel electrode was used as the positive electrode of the battery. A polypropylene nonwoven fabric having a hydrophilic property was used as the separator. After filled with an electrolyte of an aqueous potassium hydroxide solution having a specific gravity of 1.3, which also dissolved lithium hydroxide at a concentration of 30 g/L, the vessel was sealed at its open end to produce a sealed-type battery.

The batteries produced in the above-mentioned manner were subjected to 10 cycles of charging and discharging each in such a mode that they were charged at 0.2 C (5-hour rate) at 20° C. up to 120% and discharged at 0.2 C until the voltage decreased to 0.8 V, and thereafter charged at 0.1 C at 20° C. and discharged at 1 C at 0° C.

Figure 2:
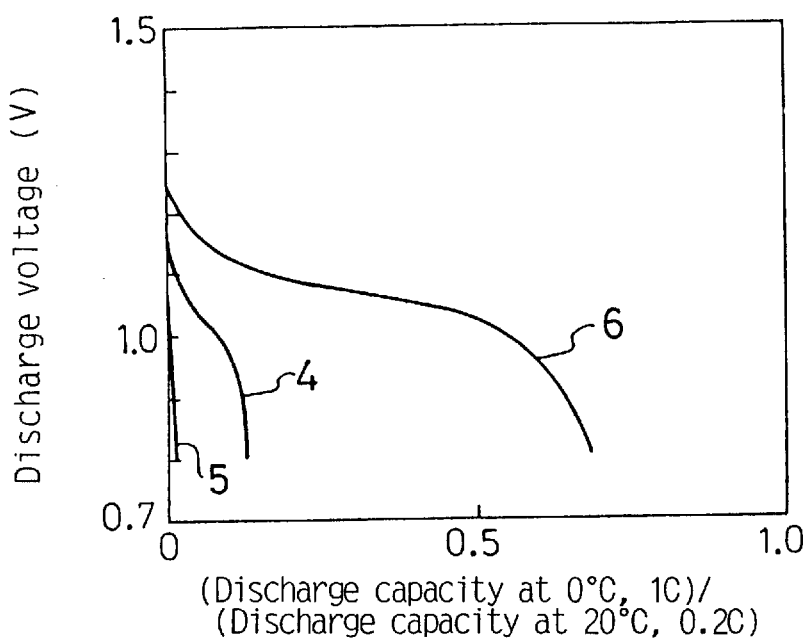
FIG. 2 is a diagram showing low-temperature high-rate discharge characteristics of sealed-type storage batteries provided with electrodes made of the hydrogen storage alloys subjected to various treatments.

FIG. 2 is a diagram showing the relationships between the ratios of the discharge capacities at 1 C at 0° C. to the discharge capacities at 0.2 C at 20° C., and the discharge voltages.

The numerals in the diagram indicate the number of battery samples. Sample No.4 represents a battery configured with an electrode made of an alloy subjected to the prior art alkali treatment, Sample No.5 represents a battery configured with an electrode made of an alloy without any treatment, and Sample No.6 represents a battery configured with an electrode made of an alloy subjected to the alkali treatment in accordance with this example.

As clearly shown by FIG. 2, the battery of Sample No.6 demonstrates the largest discharge capacity and the highest discharge voltage.

Based on the above-mentioned results, it is confirmed that the electrode having an excellent performance can be produced by the treatment in accordance with this example.

EXAMPLE 2

Treatment of Alloy Electrodes with Cobalt Ion

In this example an alloy powder of the composition represented by the formula $ZrTi_{0.2}Mn_{0.5}V_{0.1}Cr_{0.4}Co_{0.1}Ni_{1.2}$ having an average particle diameter of 45 $\mu$m or smaller was used as Samples of the hydrogen storage alloy.

(1) Half-Cell Tests

Each of the above-mentioned alloy powders were mixed with polyethylene fine powder by 3 wt %, and each mixture thus obtained was filled in a foamed nickel sheet having a mean pore size of 150 $\mu$m, a porosity of 95% and a thickness of 1.0 mm. After compressed at a pressure of 5 tons/cm$^2$, the filled nickel sheet was heat-treated with a vacuum dryer at 130° C. to produce a test electrode containing 2 g of the alloy.

The test electrode was immersed in 200 ml of a 31 wt % potassium hydroxide aqueous solution which also contained cobalt hydroxide equivalent to metal cobalt of 0.6 wt % of the alloy, and was placed in a thermostat bath filled with nitrogen gas and kept at 110° C. This state was maintained until the cobalt blue color of the alkali treatment solution disappeared. A time point at which the cobalt blue color of the alkali treatment solution disappeared was regarded as an end point, and the electrode was taken out from the solution, washed with water and dried.

For comparison, a test electrode which had been subjected to another immersing treatment with a 31 wt % KOH aqueous solution without containing any cobalt ion at the same temperature of 110° C. for the same time period, and another test electrode with no alkali treatment were prepared.

In order to evaluate the charging and discharging cycle characteristics of the above-mentioned respective electrodes, the half-cells similar to those in Example 1 were produced by combining each of them with one of the sintered-type nickel electrode having an excessive capacity. These half-cells were subjected to the repeated charging and discharging cycles under the same conditions as those in Example 1, and the discharge capacity was measured for every cycle.

Figure 3:
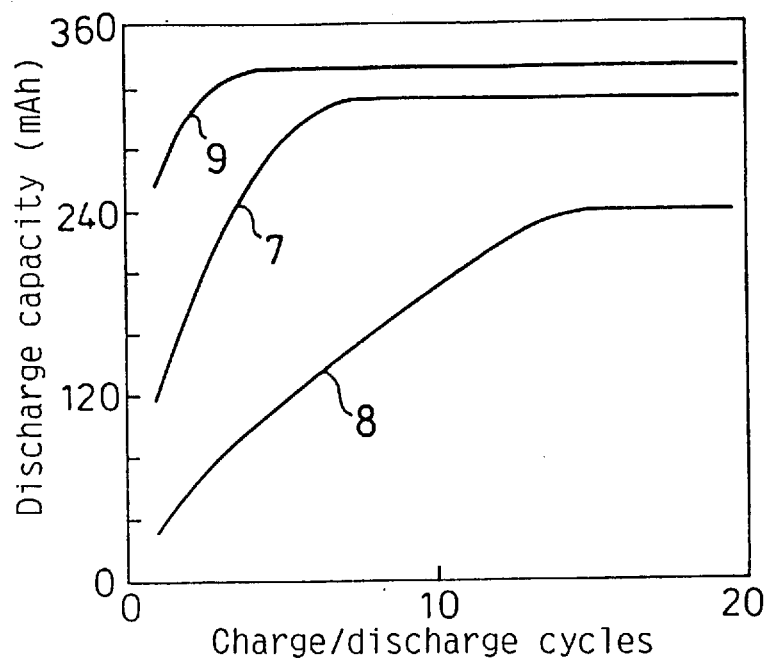
FIG. 3 is a diagram showing the changes in the discharge capacity with the accumulation of charging and discharging cycles of the hydrogen storage alloy electrodes subjected to various treatments.

FIG. 3 is a diagram showing the results of the tests. An abscissa in FIG. 3 indicates the number of charging and discharging cycles and an ordinate indicates the discharge capacity per 1 g of the alloy. The numerals in the diagram indicate the number of alloy electrodes. Sample No.7 represents an alloy electrode subjected to the prior art alkali treatment, Sample No.8 represents an alloy electrode without any treatment, and Sample No.9 represents an alloy electrode subjected to the alkali treatment in accordance with this example.

As clearly shown in this diagram, the discharge capacity of Sample No.7 increases from about 120 mAh/g at the first cycle and about 170 mAh/g at the second cycle, and reaches its constant value of about 310 mAh/g at the 7th cycle and thereafter. In contrast, Sample No.8 demonstrates a gradual increase in the discharge capacity by the 12th cycle, which reaches its constant value at the 13th cycle and thereafter. The discharge capacity of Sample No.8 is however a low value of 240 mAh/g after a lapse of 20 cycles. The alloy electrode of this example, i.e., Sample No.9 demonstrates the discharge capacity of 255 mAh/g at the first cycle, 300 mAh/g at the second cycle, and 330 mAh/g at the 4th cycle and thereafter, which is substantially the constant high value.

(2) Sealed-Type Battery Tests

Next, sealed-type batteries were configured in order to investigate the battery characteristics.

To the alloy powder of the above-mentioned composition, a dilute aqueous solution of carboxymethyl cellulose was added and mixed well to prepare a paste, which was then filled in a foamed nickel sheet having a mean pore size of 150 $\mu$m, a porosity of 95% and a thickness of 1.0 mm. The filled nickel sheet was dried at 120° C., and compressed by means of a roller press to prepare an electrode.

The electrode thus prepared was immersed in 200 ml of a 31 wt % potassium hydroxide aqueous solution which also contained cobalt hydroxide equivalent to metal cobalt of 0.6 wt % of the alloy, and was placed in a thermostat bath filled with nitrogen gas and kept at 110° C. This state was maintained until the cobalt blue color of the alkali treatment solution disappeared. A time point at which the cobalt blue color of the alkali treatment solution disappeared was regarded as an end point, and the electrode was taken out from the solution, washed with water and dried. The surface of the electrode was coated with fluorocarbon resin powder.

For comparison, a test electrode which had been subjected to another immersing treatment with a 31 wt % KOH aqueous solution without containing any cobalt ion at the same temperature of 110° C. for the same time period, and another test electrode with no alkali treatment were prepared.

Each of these electrodes were cut to have a rectangular shape having a width of 3.3 cm, a length of 21 cm and a thickness of 0.4 mm, and two lead plates were attached to the predetermined two points of the respective electrode to form a negative electrode. Each negative electrode was combined with a positive electrode (capacity: 3.0 Ah) made of foamed nickel and completed to a sealed-type battery similar to that in Example 1.

The batteries produced in the above-mentioned manner were subjected to 10 cycles of charging and discharging each in such a mode that they were charged at 0.2 C (5-hour rate) at 20° C. up to 120% and discharged at 0.2 C until the voltage decreased to 0.8 V, and thereafter charged at 0.1 C at 20° C. and discharged at 1 C at 0° C.

Figure 4:
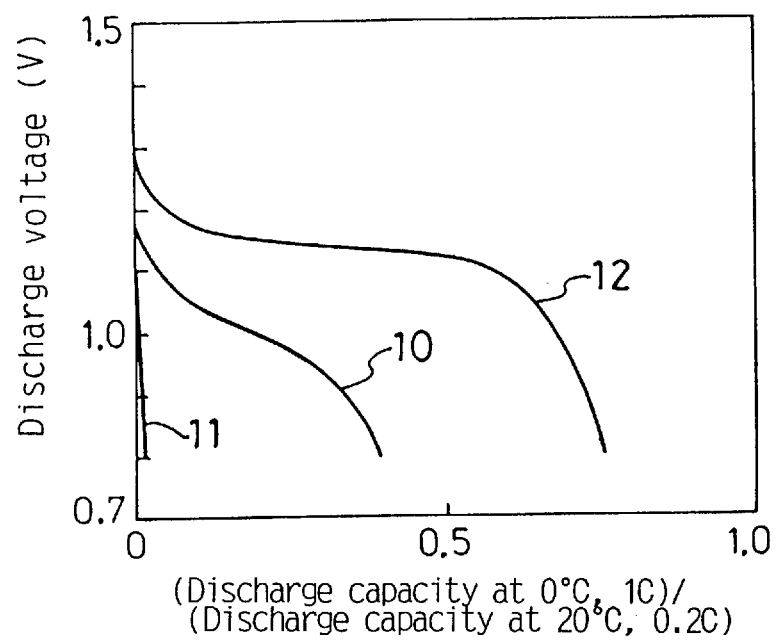
FIG. 4 is a diagram showing low-temperature high-rate discharge characteristics of the sealed-type storage batteries provided with the hydrogen storage alloy electrodes subjected to various treatments.

FIG. 4 is a diagram showing the results of the charging and discharging cycles. Sample No.10 represents a battery configured with an alloy electrode subjected to the prior art alkali treatment, Sample No.11 represents a battery configured with an alloy electrode without any treatment, and Sample No.12 represents a battery configured with an alloy electrode subjected to the alkali treatment in accordance with this example.

As clearly shown by FIG. 4, the battery of Sample No.12 demonstrates the largest discharge capacity and the highest discharge voltage.

Based on the above-mentioned results, it is confirmed that the electrode having an excellent performance can be produced by the treatment in accordance with this example.

EXAMPLE 3

Treatment of Alloy Powders and Electrode with Cobalt Ion

An alloy powder of the composition represented by the formula $MmNi_{3.7}Co_{0.6}Mn_{0.4}Al_{0.3}$ having an average particle diameter of 45 $\mu$m or smaller was used as Samples of the hydrogen storage alloy.

For 100 g of the alloy powder, 200 ml of a 31 wt % potassium hydroxide aqueous solution containing cobalt hydroxide equivalent to 0.5 g of metal cobalt was prepared as an alkali treatment solution.

The alkali treatment solution was placed in a container made of a heat-resistant resin and heated to 90° C. Then, after the alloy powder was put in the heated alkali treatment solution containing cobalt ion, the container was closed with a lid. The alkali treatment solution was heated by stirring until its cobalt blue color disappeared.

A time point at which the cobalt blue color of the alkali treatment solution disappeared was regarded as an end point, and the solution was cooled and stood still. After the supernatant of the solution was removed, it was washed with water, adjusted the pH value, filtered, and dried to obtain the alloy powder.

To the above-mentioned alloy powder, a dilute aqueous solution of carboxymethyl cellulose was added and mixed well to prepare a paste, which was then filled in a foamed nickel sheet having a mean pore size of 150 $\mu$m, a porosity of 95% and a thickness of 1.0 mm. The filled nickel sheet was dried at 120° C., and compressed by means of a roller press to prepare an electrode.

The thus prepared electrode was immersed in 200 ml of a 31 wt % potassium hydroxide aqueous solution which also contained cobalt hydroxide equivalent to metal cobalt of 0.6 wt % of the alloy contained in the electrode, and was placed in a thermostat bath filled with nitrogen gas and kept at 90° C. This state was maintained until the cobalt blue color of the alkali treatment solution disappeared. At a time point at which the cobalt blue color of the alkali treatment solution disappeared was regarded as an end point, and the electrode was taken out from the solution, washed with water and dried to obtain the test electrode. Fluorocarbon resin powder was coated on the surface of the electrode.

This electrode was cut to have a rectangular shape having a width of 3.3 cm, a length of 21 cm and a thickness of 0.4 mm, and two lead plates were attached to the predetermined two points of the respective electrode to form a negative electrode. This negative electrode was combined with a positive electrode (capacity: 3.0 Ah) made of foamed nickel and completed to a sealed-type battery similar to that in Example 1.

For comparison, a test battery configured with an electrode made of the alloy powder treated in a manner similar to that in Example 1, and another battery configured with the electrode treated in a manner similar to that in Example 2 were produced.

The batteries produced in the above-mentioned manner were subjected to 10 cycles of charging and discharging each in such a mode that they were charged at 0.2 C (5-hour rate) at 20° C. up to 120% and discharged at 0.2 C until the voltage decreased to 0.8 V, and thereafter charged at 0.1 C at 20° C. and discharged at 1 C at 0° C. The results thereof are summarized in FIG. 5.

Figure 5:
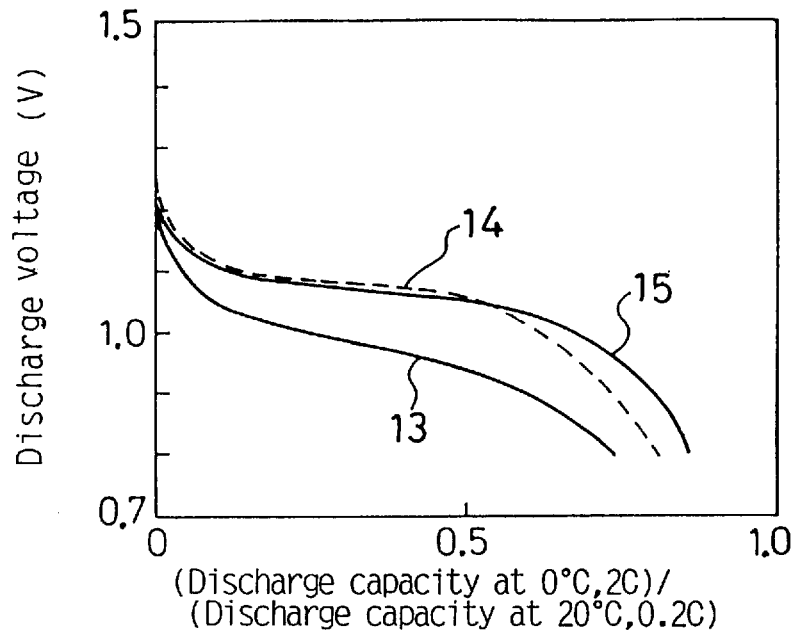
FIG. 5 is a diagram showing low temperature high-rate discharge characteristics of the sealed-type storage batteries provided with the hydrogen storage alloy electrodes subjected to the treatments under different conditions.

In FIG. 5, Sample No.13 represents a battery configured with an electrode made of an alloy powder subjected to the treatment of Example 1, Sample No.14 represents a battery configured with an alloy electrode subjected to the treatment of Example 2, and Sample No.15 represents a battery configured with an alloy electrode made of an alloy subjected to the alkali treatment in accordance with this example, that is, the electrode was treated at the stage of alloy powder and further at the stage of electrode. From the results shown by FIG. 5, the battery of Sample No.15 demonstrates the largest discharge capacity and the highest discharge voltage.

Figure 6:
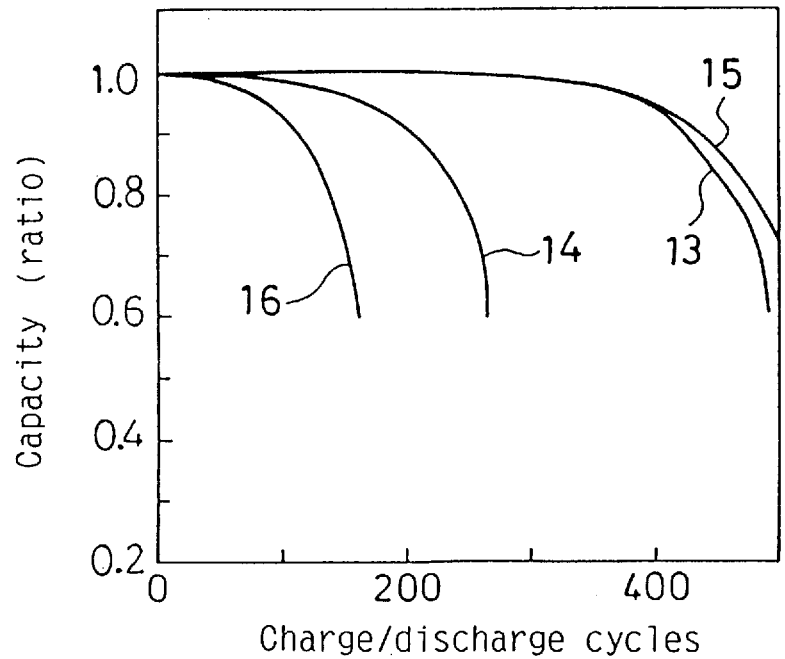
FIG. 6 is a diagram showing the charging and discharging cycle life characteristics of the sealed-type storage batteries provided with the hydrogen storage alloy electrodes subjected to the treatments under different conditions.

Next, the charging and discharging cycle life at 45° C. of these batteries was investigated. The results thereof are summarized in FIG. 6. In FIG. 6, Sample No.16 represents a battery configured with an electrode made of an alloy powder without any treatment. From the results shown by FIG. 6, the battery of Sample No.15 demonstrates the most excellent performance.

Gathered together, the above-mentioned results provide the following facts:

In Sample No.13, in order to maintain a relatively excellent charging and discharging cycle life characteristic, an intensive alkali treatment was performed on the alloy powder as a whole, whereby part of the alloy was substituted with cobalt. It is believed that as a result of the intensive alkali treatment, the surfaces of the alloy particles were destroyed resulting in an increase in the contact resistance between the alloy particles, thereby reducing its high-rate discharge characteristic at a low temperature.

Further, in Sample No.14, the alkali treatment including cobalt substitution influences only the alloy particles exposed on the surface of the electrode and the inner structure of the electrode is only scarcely influenced. For that reason, Sample No.14 maintains a relatively excellent high-rate discharge characteristic at a low temperature. It is however believed that the deterioration in the alloy powder characteristics inside the inner structure of the electrode of Sample No.14 has become prominent with the lapse of the cycles, and thus the charging and discharging cycle life is deteriorated more rapidly than that of the other samples.

As discussed above, it is possible to produce a sealed-type battery being excellent in both the low-temperature high-rate discharge characteristic and the charging and discharging cycle life characteristic, by adequately selecting the alkali treatment conditions including cobalt ion substitution with respect to the surface of the electrode and with respect to the inner structure of the electrode, respectively.

EXAMPLE 4

Treatment of Alloy Powders with Copper Ion

An alloy powder of the composition represented by the formula $ZrMn_{0.5}V_{0.1}Cr_{0.2}Co_{0.1}Ni_{1.2}$ having an average particle diameter of 45 μm or smaller was used as samples of the hydrogen storage alloy.

For 100 g of the alloy powder, 200 ml of a 31 wt % potassium hydroxide aqueous solution which contained 1 g of tartaric acid and copper hydroxide equivalent to 1 g of metal copper was prepared as an alkali treatment solution.

The alkali treatment solution was placed in a container made of a heat-resistant resin and heated to 110° C. Copper hydroxide or copper oxide as the copper ion source may be added to the alkali treatment solution after it is heated. Then, after the alloy powder was put in the heated alkali treatment containing copper ion, the container was closed with a lid. The alkali treatment solution was heated by stirring until its copper blue color disappeared.

A time point at which the copper blue color of the alkali treatment solution disappeared was regarded as an end point, and the solution was cooled and stood still. After the supernatant of the solution was removed, it was washed with water, adjusted the pH value, filtered, and dried to obtain the alloy powder.

Although the above-mentioned treatment was performed at 110° C., it is possible to shorten the treatment time by employing a higher treatment temperature.

For comparison, a hydrogen storage alloy which had been subjected to another immersing treatment with a 31 wt % KOH aqueous solution without containing any copper ion at the same temperature of 110° C. for the same time period, and another alloy with no alkali treatment were prepared.

(1) Half-Cell Tests

Half-cell tests for evaluating the electrode characteristics as a negative electrode for an alkaline storage battery, in particular, the charging and discharging cycle characteristic by the electrochemical charging and discharging reaction were carried out for the respective alloy samples.

Each 1 g of the above-mentioned alloy sample powders were mixed well with 3 g of carbonyl nickel powder and 0.12 g of polyethylene fine powder, as a conductive agent and a binder, respectively, by stirring. And each mixture thus obtained was molded into a disk of a diameter of 24.5 mm and a thickness of 2.5 mm by means of press working. The disk was heated in a vacuum at 130° C. for 1 hour to melt the binder, thereby to produce a hydrogen storage alloy electrode.

In order to evaluate the charging and discharging cycle characteristics of the above-mentioned respective electrodes, the half-cells similar to those in Example 1 were produced by combining each of them with one of the sintered-type nickel electrodes having an excessive capacity. These half-cells were subjected to the repeated charging and discharging cycles under the same conditions as those in Example 1, and the discharge capacity was measured for every cycle.

Figure 7:
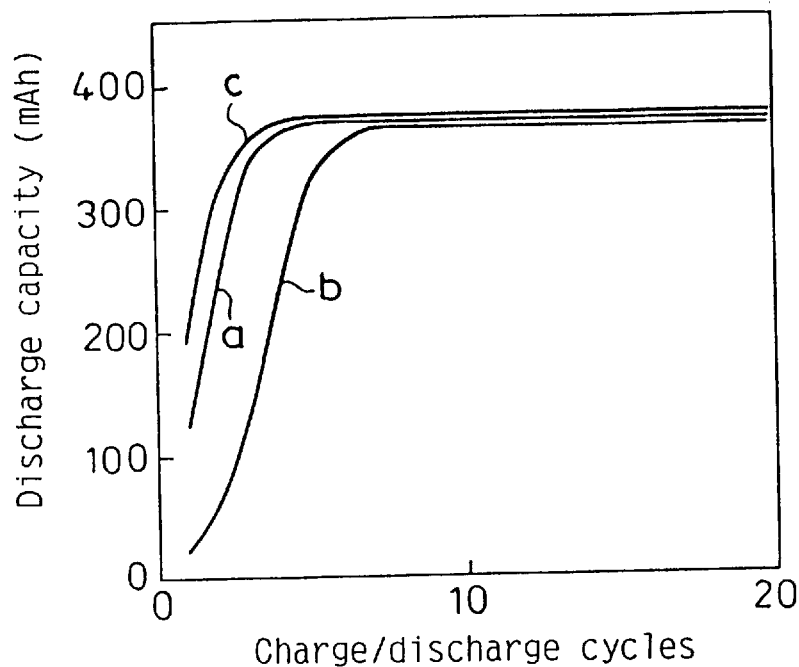
FIG. 7 is a diagram showing the changes in the discharge capacity with the accumulation of charging and discharging cycles of the electrodes made of the hydrogen storage alloy powders subjected to various treatments.

FIG. 7 is a diagram showing the results of the tests. An abscissa in FIG. 7 indicates the number of charging and discharging cycles and an ordinate indicates the discharge capacity per 1 g of the alloy. The characters in the diagram indicate the name of the alloy electrodes. Sample "a" represents an alloy electrode subjected to the prior art alkali treatment, Sample "b" represents an alloy electrode without any treatment, and Sample "c" represents an alloy electrode subjected to the alkali treatment in accordance with this example.

As clearly shown in this diagram, the discharge capacity of Sample "a" increases from about 120 mAh/g at the first cycle and about 250 mAh/g at the second cycle, and reaches its constant value of about 370 mAh/g at the 5th cycle and the subsequent cycles. In contrast, the discharge capacity of Sample "b" increases from 20 mAh/g at the first cycle and 60 mAh/g at the second cycle, and reaches its constant value of about 365 mAh/g at the 7th cycle and thereafter. The alloy electrode of this example, i.e., Sample "c" demonstrates the discharge capacity of 190 mAh/g at the first cycle, 305 mAh/g at the second cycle, and reaches 370 mAh/g at the 4th and the subsequent cycles, which is substantially the constant high value.

The following are considered to be the cause for the most excellent discharge capacity demonstrated by Sample "c" of this example. Firstly, since the surface of the alloy has been treated with a high temperature alkaline solution, the alloy is stable for the alkaline electrolyte, and thus sufficient contact between the alloy particles is maintained. Secondly, the contact resistance between the particles is reduced by the deposition of metal copper particles on the surface of the alloy.

(2) Sealed-Type Battery Tests

Next, sealed-type batteries were configured in order to investigate the battery characteristics.

To each of the above-mentioned alloy sample powders with or without alkali treatment, a dilute aqueous solution of carboxymethyl cellulose was added and mixed well to prepare a paste, which was then filled in a foamed nickel sheet having a mean pore size of 150 $\mu$m, a porosity of 95% and a thickness of 1.0 mm. The filled nickel sheet was dried at 120° C., and compressed by means of a roller press. The surface of the compressed nickel sheet was coated with fluorocarbon resin powder to prepare an electrode.

Each of these electrodes were cut to have a rectangular shape having a width of 3.3 cm, a length of 21 cm and a thickness of 0.4 mm, and two lead plates were attached to the predetermined two points of the respective electrode to form a negative electrode. Each negative electrode was spirally rolled up together with a positive electrode (capacity: 3.0 Ah) and a separator, with the separator disposed between the two electrodes. The cylindrical electrode roll thus obtained was placed in a size SC vessel. A well-known foamed nickel electrode was used as the positive electrode of the battery. A polypropylene nonwoven fabric having a hydrophilic property was used as the separator. After filled with an electrolyte of an aqueous potassium hydroxide having a specific gravity of 1.3, which also dissolved lithium hydroxide in 30 g/L, the vessel was sealed at its open end to produce a sealed-type battery.

The batteries produced in the above-mentioned manner were subjected to 10 cycles of charging and discharging each in such a mode that they were charged at 0.2 C (5-hour rate) at 20° C. up to 120% and discharged at 0.2 C until the voltage decreased to 0.8 V, and thereafter charged at 0.1 C at 20° C. and discharged at 1 C at 0° C.

Figure 8:
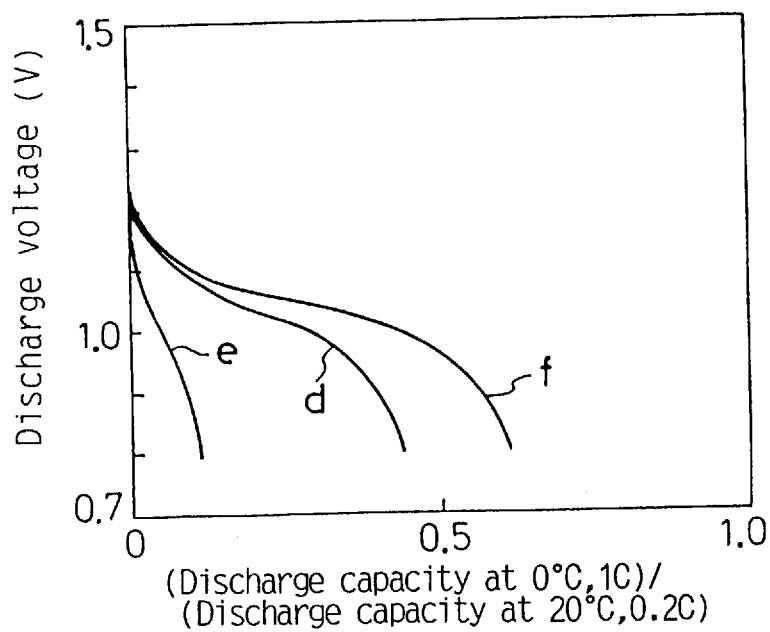
FIG. 8 is a diagram showing low-temperature high-rate discharge characteristics of the sealed-type storage batteries provided with the electrodes made of the hydrogen storage alloy powders subjected to various treatments.

FIG. 8 is a diagram showing the relationships between the ratios of the discharge capacity at 1 C at 0° C. to the discharge capacity at 0.2 C at 20° C., and the discharge voltages.

Sample "d" represents a battery configured with an electrode made of an alloy powder subjected to the prior art alkali treatment, Sample "e" represents a battery configured with an electrode made of an alloy powder without any treatment, and Sample "f" represents a battery configured with an electrode made of an alloy powder subjected to the alkali treatment in accordance with this example.

As clearly shown by FIG. 8, the battery of Sample "f" demonstrates the largest discharge capacity and the highest discharge voltage.

Based on the above-mentioned results, it is confirmed that the electrode having an excellent performance can be produced by the treatment in accordance with this example.

EXAMPLE 5

Treatment of Electrodes with Copper Ion

In this example, an alloy powder of the composition represented by the formula $Zr_{0.9}Ti_{0.3}Mn_{0.7}V_{0.1}Cr_{0.2}Co_{0.1}Ni_{1.2}$ having an average particle diameter of 45 $\mu$m or smaller was used as Samples of the hydrogen storage alloy.

(1) Half-Cell Tests

Each of the above-mentioned alloy powders were mixed with polyethylene fine powder by 3 wt %, and each mixture thus obtained was filled in a foamed nickel sheet having a mean pore size of 150 $\mu$m, a porosity of 95% and a thickness of 1.0 mm. After the filled nickel sheet was compressed at a pressure of 5 tons/cm$^2$, it was heat-treated with a vacuum dryer at 130° C. to produce a test electrode containing 2 g of the alloy.

The electrode thus prepared was immersed in 200 ml of a 31 wt % potassium hydroxide aqueous solution which contained 1 g of tartaric acid and copper hydroxide equivalent to metal copper of 0.6 wt % of the alloy powder, and was placed in a thermostat bath filled with nitrogen gas and kept at 110° C. This state was maintained until the copper blue color of the alkali treatment solution disappeared. A time point at which the blue color of the alkali treatment solution disappeared was regarded as an end point, and the electrode was taken out from the solution, washed with water and dried.

For comparison, a test electrode which had been subjected to another immersing treatment with a 31 wt % KOH aqueous solution without containing any copper ion at the same temperature of 110° C. for the same time period, and another test electrode with no alkali treatment were prepared.

In order to evaluate the charging and discharging cycle characteristics of the above-mentioned respective electrodes, the half-cells similar to those in Example 1 were produced by combining each of them with one of the sintered-type nickel positive electrodes having an excessive capacity. These half-cells were subjected to the repeated charging and discharging cycles under the same conditions as those in Example 1, and the discharge capacity was measured for every cycle. The results of the tests are summarized in FIG. 9.

Figure 9:
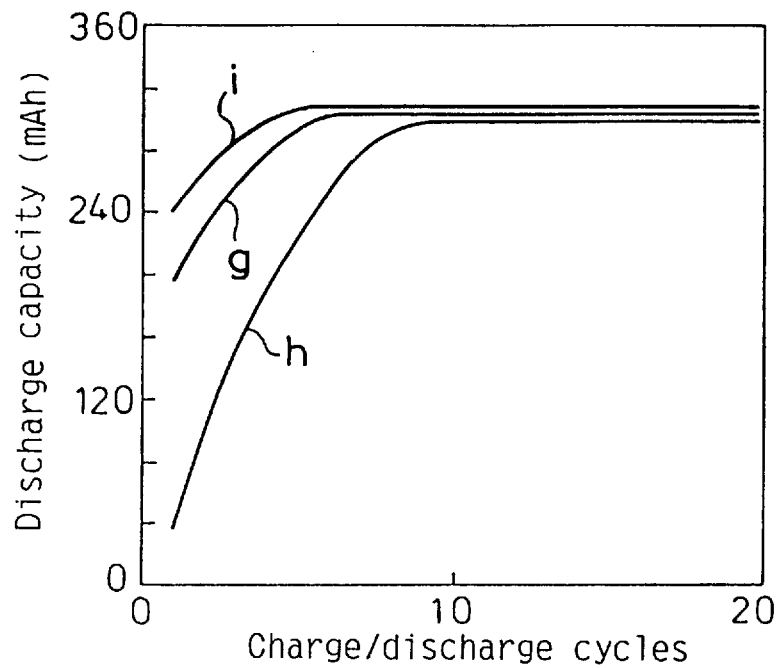
FIG. 9 is a diagram showing the changes in the discharge capacity with the accumulation of charging and discharging cycles of the hydrogen storage alloy electrodes subjected to various treatments.

An abscissa in FIG. 9 indicates the number of charging and discharging cycles and an ordinate indicates the discharge capacity per 1 g of the alloy. In FIG. 9, Sample "g" represents an alloy electrode subjected to the prior art alkali treatment, Sample "h" represents an alloy electrode without any treatment, and Sample "i" represents an alloy electrode subjected to the alkali treatment in accordance with this example.

As clearly shown in this diagram, the discharge capacity of Sample "g" increases from about 200 mAh/g at the first cycle and about 230 mAh/g at the second cycle, and reaches its constant value of about 305 mAti/g at the 6th cycle and the subsequent cycles. In contrast, Sample "h" demonstrates a constant value of the discharge capacity of 300 mAh at the 9th cycle and the subsequent cycles. The alloy electrode of this example, i.e., Sample "i" demonstrates a discharge capacity of 240 mAh/g at the first cycle, 270 mAh/g at the second cycle, and 310 mAh/g at the 5th cycle, which is substantially a constant value.

(2) Sealed-Type Battery Tests

Next, sealed-type batteries were configured in order to investigate the battery characteristics.

To the alloy sample powder of the above-mentioned composition, a dilute aqueous solution of carboxymethyl cellulose was added and mixed well to prepare a paste, which was then filled in a foamed nickel sheet having a mean pore size of 150mm, a porosity of 95% and a thickness of 1.0 mm. The filled nickel sheet was dried at 120° C., and compressed by means of a roller press to prepare an electrode.

The electrode thus prepared was immersed in 200 ml of a 31 wt % potassium hydroxide aqueous solution which contained 1 g of tartaric acid and copper hydroxide equivalent to metal copper of 0.6 wt % of the alloy powder, and was placed in a thermostat bath filled with nitrogen gas and kept at 110° C. This state was maintained until the copper blue color of the alkali treatment solution disappeared. A time point at which the blue color of the alkali treatment solution disappeared was regarded as an end point, and the electrode was taken out from the solution, washed with water and dried. And the dried electrode was coated with fluorocarbon resin powder.

For comparison, another electrode was produced by subjecting an electrode to another immersing treatment with a 31% KOH aqueous solution without containing any copper ion.

Each of these electrodes were cut to have a rectangular shape having a width of 3.3 cm, a length of 21 cm and a thickness of 0.4 mm, and two lead plates were attached to the predetermined two points of the respective electrode to form a negative electrode. Each negative electrode was combined with a positive electrode (capacity: 3.0 Ah) made of foamed nickel and completed to a sealed-type battery similar to that in Example 4.

The batteries produced in the above-mentioned manner were subjected to 10 cycles of charging and discharging each in such a mode that they were charged at 0.2 C (5-hour rate) at 20° C. up to 120% and discharged at 0.2 C until the voltage decreased to 0.8 V, and thereafter charged at 0.1 C at 20° C. and discharged at 1 C at 0° C. The results of the tests are summarized in FIG. 10.

Sample "j" represents a battery configured with an electrode subjected to the prior art alkali treatment, Sample "k" represents a battery configured with an electrode without any treatment, and Sample "l" represents a battery configured with an electrode subjected to the alkali treatment in accordance with this example.

Figure 10:
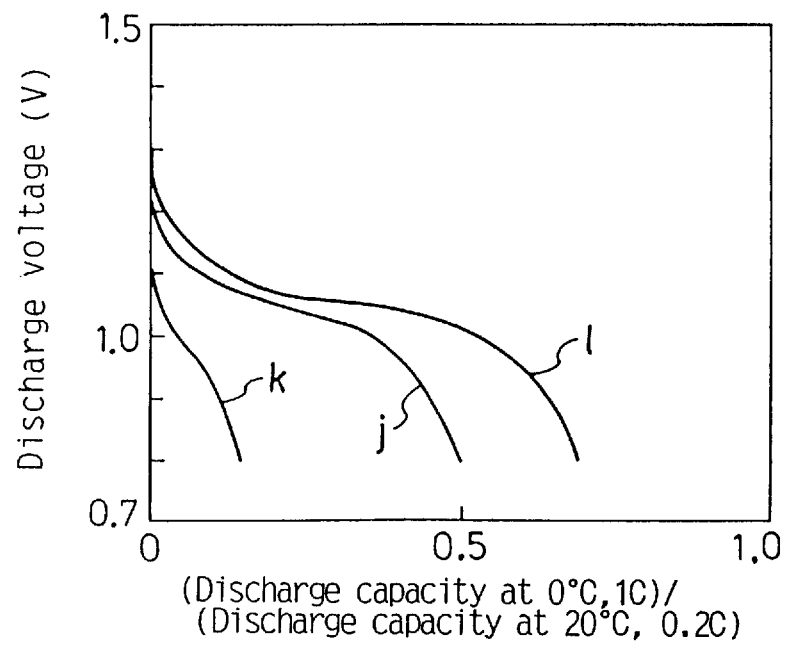
FIG. 10 is a diagram showing low-temperature high-rate discharge characteristics of the sealed-type storage batteries provided with the hydrogen storage alloy electrodes subjected to various treatments.

As clearly shown by FIG. 10, the battery of Sample "l" demonstrates the largest discharge capacity and the highest discharge voltage.

Based on the above-mentioned results, it is confirmed that the electrode having an excellent performance can be produced by the treatment in accordance with this example.

EXAMPLE 6

Treatment of Alloy Powders and Electrode with Copper Ion

An alloy powder of the composition represented by the formula $MmNi_{3.75}Co_{0.55}Mn_{0.4}Al_{0.3}$ having an average particle diameter of 45 μm or smaller was used as Samples of the hydrogen storage alloy.

As an alkali treatment solution, for 100 g of the alloy powder, 200 ml of a 31 wt % potassium hydroxide aqueous solution, which contained 1 g of tartaric acid and copper hydroxide equivalent to 0.5 g of metal copper, was prepared.

The alkali treatment solution was placed in a container made of a heat-resistant resin and heated to 80° C. Then, after the alloy powder was put in the heated alkali treatment solution containing copper ion, the container was closed with a lid. The alkali treatment solution was heated by stirring until its copper blue color disappeared.

A time point at which the copper blue color of the alkali treatment solution disappeared was regarded as an end point, and the solution was cooled and stood still. After the supernatant of the solution was removed, it was washed with water, adjusted the pH value, filtered, and dried to obtain the alloy powder.

To the alloy powder thus obtained, a dilute aqueous solution of carboxymethyl cellulose was added and mixed well to prepare a paste, which was then filled in a foamed nickel sheet having a mean pore size of 150 μm, a porosity of 95% and a thickness of 1.0 mm. The filled nickel sheet was dried at 120° C., and compressed by means of a roller press to obtain an electrode.

The electrode was immersed in 200 ml of a 31 wt % potassium hydroxide aqueous solution which contained 1 g of tartaric acid and copper hydroxide equivalent to metal copper of 0.2 wt % of the alloy powder, and was placed in a thermostat bath filled with nitrogen gas and kept at 90° C. This state was maintained until the copper blue color of the alkali treatment solution disappeared. A time point at which the blue color of the alkali treatment solution disappeared was regarded as an end point, and the electrode was taken out from the solution, washed with water and dried. Fluorocarbon resin powder was coated on the surface of the electrode.

This electrode was cut to have a rectangular shape having a width of 3.3 cm, a length of 21 cm and a thickness of 0.4 mm, and two lead plates were attached to the predetermined two points of the electrode to form a negative electrode. The negative electrode was combined with a positive electrode (capacity: 3.0 Ah) made of foamed nickel and completed to a sealed-type battery similar to that in Example 4.

For comparison, a test battery configured with an electrode made of the alloy powder treated in a manner similar to that in Example 4, and another battery configured with the electrode treated in a manner similar to that in Example 5 were produced.

Figure 11:
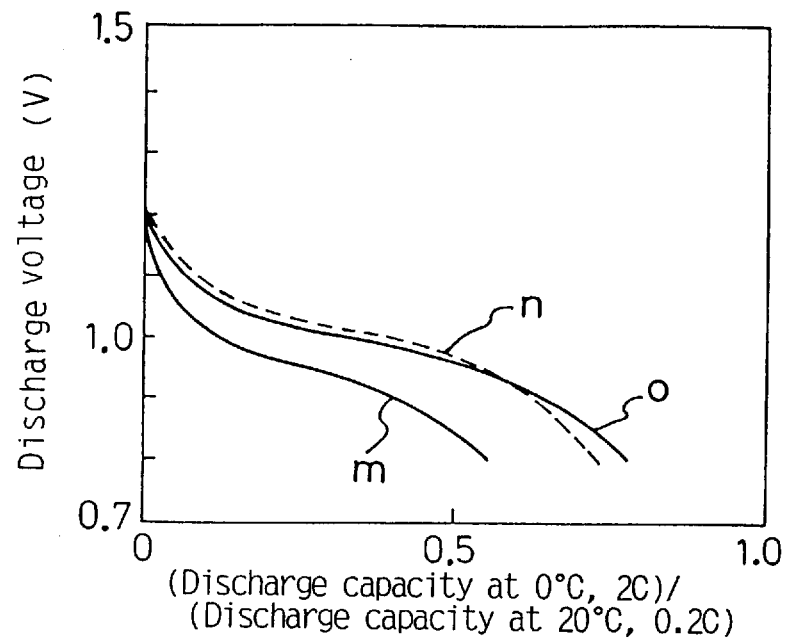
FIG. 11 is a diagram showing low-temperature high-rate discharge characteristics of the sealed-type storage batteries provided with the hydrogen storage alloy electrodes subjected to the treatments under different conditions.

The batteries produced in the above-mentioned manner were subjected to 10 cycles of charging and discharging each in such a mode that they were charged at 0.2 C (5-hour rate) at 20° C. up to 120% and discharged at 0.2 C until the voltage decreased to 0.8 V, and thereafter charged at 0.1 C at 20° C. and discharged at 2 C at 0° C. The results thereof are summarized in FIG. 11.

Sample "m" represents a battery configured with an electrode made of an alloy powder subjected to the treatment of Example 4, Sample "n" represents a battery configured with an alloy electrode subjected to the treatment of Example 5, and Sample "o" represents a battery configured with an electrode made of an alloy subjected to the alkali treatment in accordance with this example, namely, the electrode that was treated at the stage of alloy powder and further treated at the stage of electrode. From the results shown by FIG. 11, it is appreciated that the battery of Sample "o" demonstrates the largest discharge capacity and the highest discharge voltage.

Figure 12:
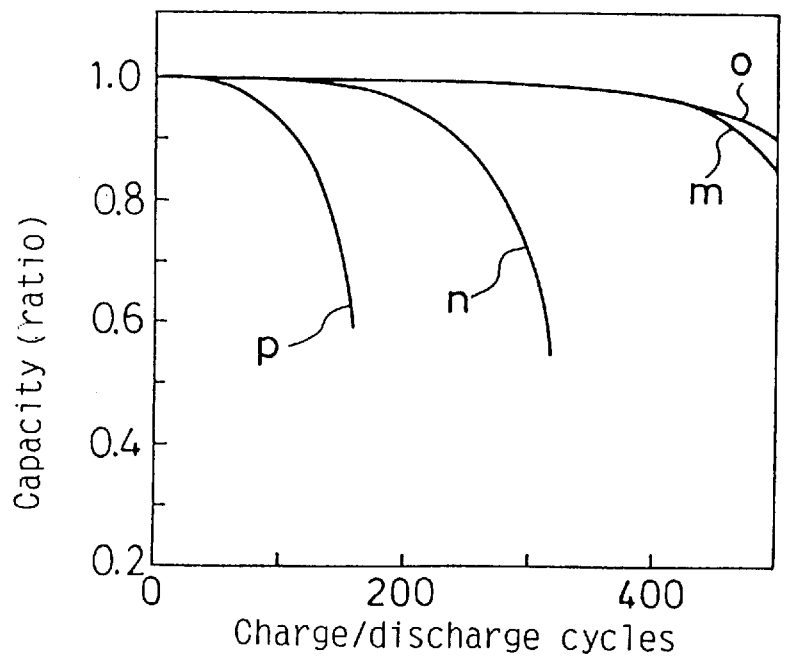
FIG. 12 is a diagram showing the charging and discharging cycle life characteristics of the sealed-type storage batteries provided with the hydrogen storage alloy electrodes subjected to the treatments under different conditions.

Next, the charging and discharging cycle life at 45° C. of these batteries was investigated. The results thereof are summarized in FIG. 12. In FIG. 12, Sample "p" represents a battery configured with an electrode made of an alloy powder without any treatment. From the results shown by FIG. 12, it is appreciated that the battery of Sample "o" demonstrates the most excellent performance.

Gathered together, the above-mentioned results provide the following facts:

In Sample "m", in order to maintain a relatively excellent charging and discharging cycle life characteristic, an intensive alkali treatment was performed on the alloy powder. It is believed that as a result of the intensive alkali treatment, the surfaces of the alloy particles were destroyed, resulting in an increase in contact resistance between the alloy particles, thereby reducing its low-temperature high-rate discharge characteristic.

Further, in Sample "n", the alkali treatment including copper ion substitution influences only the alloy particles exposed on the surface of the electrode and the inner structure of the electrode is only influenced a little. For that reason, Sample "n" maintains a relatively excellent low-temperature high-rate discharge performance. It is however believed that deterioration in the alloy powder characteristics inside the electrode of Sample "n" has become remarkable with the lapse of the cycles, and thus the charging and discharging cycle life is deteriorated more rapidly than that of the other samples.

As discussed in the above, it is possible to produce a sealed-type battery excellent in both the low-temperature high-rate discharge characteristic and the charging and discharging cycle life characteristic, by adequately selecting the alkali treatment conditions including copper ion substitution with respect to the surface of the electrode and the inner structure of the electrode, respectively.

EXAMPLE 7

Amount of Ion and Atmosphere in the Treatment

In this example, effects of the amounts of cobalt ion and/or copper ion used in the treatment were investigated first.

Treatment of Alloy Powders

An alloy powder of the composition represented by the formula $ZrTi_{0.2}Mn_{0.5}V_{0.1}Cr_{0.4}Co_{0.1}Ni_{1.2}$ having an average particle diameter of 45 μm or smaller was used as Samples of the hydrogen storage alloy.

As alkali treatment solutions, for 100 g of the alloy powder, each 200 ml of 31 wt % potassium hydroxide aqueous solutions containing various amounts of cobalt hydroxide equivalent to 20 g of metal cobalt at the maximum were prepared. By using these solutions, the above-mentioned alloy powder was treated in a manner similar to that in Example 1.

Similar tests were performed by using copper ion in place of the cobalt ion under the treatment conditions similar to those in Example 4.

Figure 13:
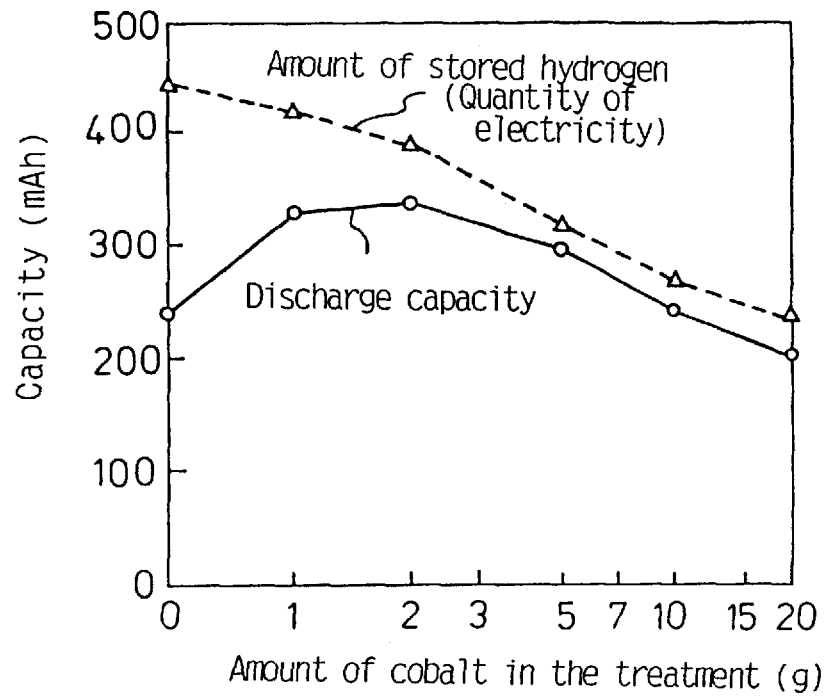
FIG. 13 is a diagram showing the changes in the amount of the stored hydrogen gas and the discharge capacity of the electrodes made of the hydrogen storage alloy powders each treated with the alkaline solution containing different amounts of cobalt ions.

FIG. 13 is a diagram showing the relationship between the amount of cobalt in the alkaline solution containing cobalt ion used in the immersing treatment and the amount of stored hydrogen of the alloy powder (converted into the quantity of electricity), as well as the relationship between the amount of cobalt and the maximum discharge capacity obtained from the half-cell tests up to 20 charging and discharging cycles of the half-cells configured with the electrode made of the alloy. The amount of stored hydrogen was measured on a Sievert apparatus. The half-cell tests were performed in a manner similar to that in Example 1.

Figure 14:
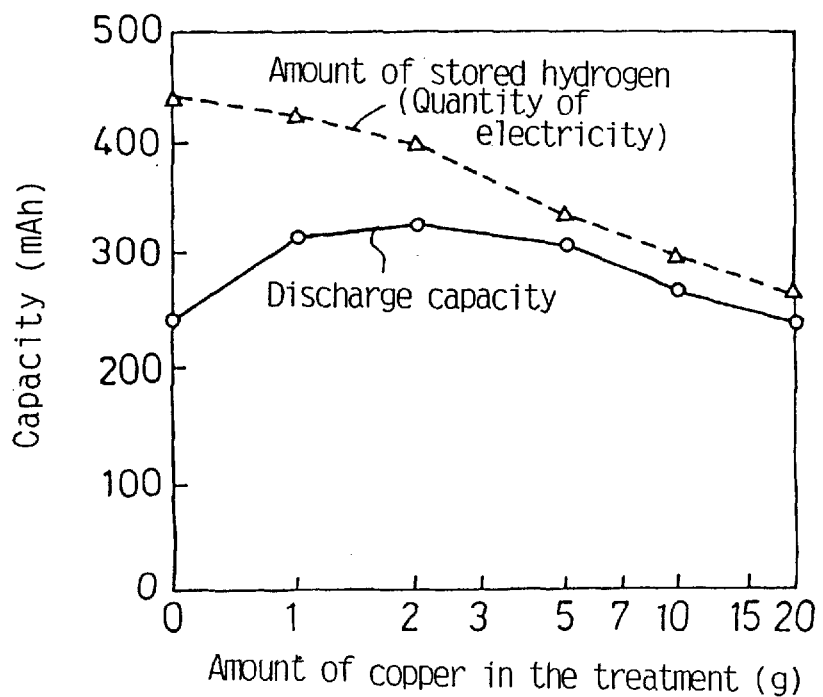
FIG. 14 is a diagram showing the changes in the amount of the stored hydrogen gas and the discharge capacities of the electrodes made of the hydrogen storage alloy powders each treated with the alkaline solution containing different amounts of copper ions.

Further, FIG. 14 is a diagram showing the relationship between the amount of copper in the alkaline solution containing copper ion used in the immersing treatment and the amount of stored hydrogen of the alloy powder, as well as the relationship between the amount of cobalt and the maximum discharge capacity obtained by the half-cell tests up to 20 charging and discharging cycles.

In each case, as clearly shown by these diagrams, the alloy powder treated with the alkali treatment solution containing cobalt ion or copper ion demonstrates a decrease of amount of stored hydrogen, with the increase of amount of the substituted cobalt or copper, namely, the amount of cobalt ion or copper ion in the treatment solution. The discharge capacity of the half-cells configured with the treated alloy powders however demonstrates a maximum at a particular point of the treatment amount in common.

Next, the influence on the alloy of the atmosphere under which the treatment was performed was investigated.

An immersing treatment was performed in a sealed container of stainless steel with a lining of fluorocarbon resin, using a 31 wt % KOH aqueous solution whose dissolved oxygen had been reduced by boiling it in a nitrogen atmosphere. The solution also contained various amounts of cobalt hydroxide equivalent to the amounts of metal cobalt up to 20 g (per 200ml) for 100 g of the alloy powder to be treated. The same treatment temperature and time as mentioned above were applied.

Figure 15:
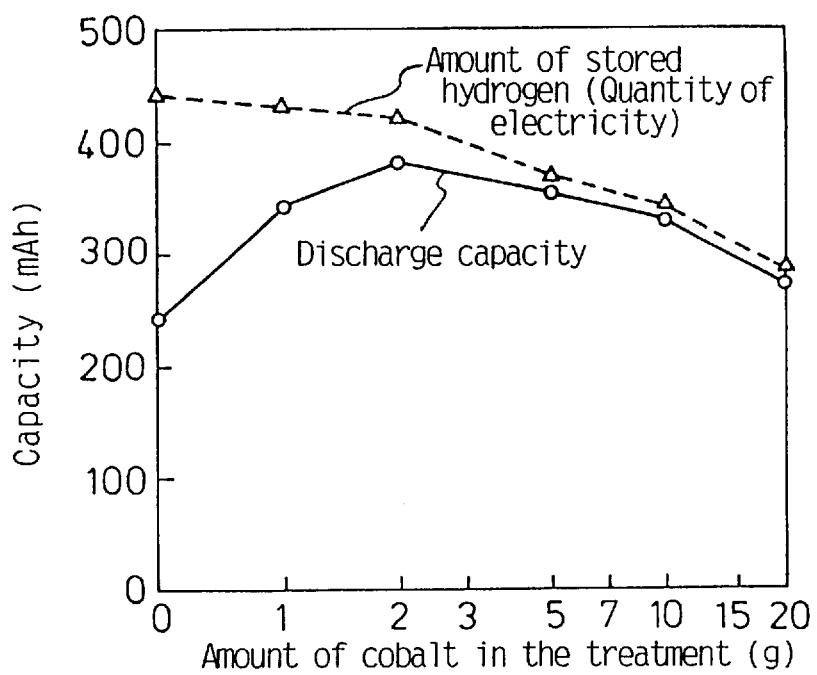
FIG. 15 is a diagram showing the changes in the amount of the stored hydrogen gas and the discharge capacity of the electrodes made of the hydrogen storage alloy powders each treated with the alkaline solution containing different amounts of cobalt ions under conditions isolated from oxygen.

FIG. 15 is a diagram showing the relationship between the amount of cobalt in the alkaline solution containing cobalt ion used in the immersing treatment and the amount of stored hydrogen of the alloy powder treated as mentioned above, as well as the relationship between the amount of cobalt and the maximum discharge capacity obtained from the half-cell tests up to 20 charging and discharging cycles. Based on this diagram, it is appreciated that the discharge capacity of the half-cells can be increased by reducing the amount of oxygen dissolved in the alkaline aqueous solution and insulating the solution from oxygen in the air. It is also appreciated that the decreases in the amount of stored hydrogen and in the discharge capacity can be alleviated by insulating the solution from oxygen even when a large amount of cobalt ion is included in the treatment solution.

In the presence of oxygen, an oxidation and dissolution of metals takes place in the alloy-constituent metals for instance, manganese, vanadium and the like, which are easily oxidized and dissolved, and a disintegration of the hydrogen storage alloy also takes place in a larger amount than the amount of cobalt ion used in the treatment. It is believed that by blocking the contact with oxygen in the air, a redox (oxidation-reduction) reaction between the cobalt ion and the metals in the alloy takes place effectively, the decreases in the amount of stored hydrogen and in the discharge capacity can be alleviated even in a condition wherein an abundant amount of cobalt ion is used in the treatment.

Further, the alloy treated with the alkaline solution containing cobalt ion in the sealed container insulated from the air demonstrated an excellent low-temperature high-rate discharge characteristic as compared with the alloy treated in the presence of oxygen. The reason for this is believed to be that hydrogen generated at the alkali treatment is stored by the alloy.

As previously described, it is possible to produce the hydrogen storage alloy having various excellent characteristics by treating the alloy with the alkaline solution containing cobalt ion in a pressure-resistant sealed container which is insulated from oxygen. The effect of shutting out the oxygen can similarly obtained with the alkaline solution containing copper ion.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A method for producing a hydrogen storage alloy electrode useful as a negative electrode of an alkaline rechargeable battery in combination with a positive electrode and an electrolyte of an alkaline aqueous solution comprising the steps of:

subjecting a hydrogen storage alloy powder to a treatment which includes immersing said hydrogen storage alloy powder in an alkaline solution containing at least one kind of ions selected from the group consisting of cobalt ions and copper ions at a temperature of 65° C. or higher; and forming the hydrogen storage alloy powder subjected to said treatment into a negative electrode for an alkaline rechargeable battery;

whereby said ions present in the alkaline solution are deposited as metal on the surface of the alloy by redox reaction with another metal present in the hydrogen storage alloy powder.

2. The method for producing the hydrogen storage alloy electrode in accordance with claim 1, wherein the ions contained in said alkaline solution are the cobalt ions and the amount of said cobalt ions is equivalent to an amount of metal cobalt of 10 wt % or smaller of said hydrogen storage alloy.

3. The method for producing the hydrogen storage alloy electrode in accordance with claim 1, wherein the ions contained in said alkaline solution are the copper ions and the amount of said copper ions is equivalent to an amount of metal copper of 10 wt % or smaller of said hydrogen storage alloy.

4. The method for producing the hydrogen storage alloy electrode in accordance with claim 1, wherein the ions contained in said alkaline solution are the copper ions and the amount of said copper ions is equivalent to an amount of metal copper of 10 wt % or smaller of said hydrogen storage alloy, and said alkaline solution further contains tartaric acid or citric acid.

5. The method for producing the hydrogen storage alloy electrode in accordance with claim 1, wherein said immersing treatment is performed in a state where said alkaline solution is isolated from contact with oxygen gas.

6. The method for producing the hydrogen storage alloy electrode in accordance with claim 1, wherein said hydrogen storage alloy is an alloy represented by the general formula $LnNi_xA_y$, wherein Ln represents at least two members selected from lanthanide elements, and A represents at least one element selected from the group consisting of Mn, Co, Al, Fe, Si, Cr and Cu; and wherein $4.5 < x+y < 5.5$, $3.0 < x$ and $0 < y < 2.5$.

7. The method for producing the hydrogen storage alloy electrode in accordance with claim 1, wherein said hydrogen storage alloy is an alloy represented by the general formula $Zr_{1.2-a}Ti_aMn_wV_xNi_yM_z$, wherein M represents at least one element selected from the group consisting of B, Al, Si, Cr, Fe, Co, Cu, Zn, Nb, Mo, Ta and W; and wherein $0 \leq a < 1.2$, $0.1 \leq w \leq 1.2$, $0 \leq x \leq 0.4$, $0.8 \leq y \leq 1.6$, $0 < z \leq 1.2$, and $1.7 \leq (a+w+x+y+z) \leq 2.7$; and the main component of the alloy phase has a hexagonal crystal structure of $MgZn_2$ or a cubic crystal structure of $MgCu_2$.

8. The method for producing the hydrogen storage alloy electrode in accordance with claim 1, wherein said hydrogen storage alloy is an alloy containing Zr or Zr and Ti, and further containing an alloy phase containing Ln and Ni as its main component in 30 wt % or less, wherein Ln represents at least one member selected from lanthanide elements.

9. A method for producing a hydrogen storage alloy electrode useful as a negative electrode of an alkaline rechargeable battery in combination with a positive electrode and an electrolyte of an alkaline aqueous solution comprising the step of subjecting a negative electrode made of a hydrogen storage alloy powder to a treatment which includes immersing said electrode in an alkaline solution at a temperature of 65° C. or higher; and wherein said alkaline solution contains at least one kind of ions selected from the group consisting of cobalt ions and copper ions;

whereby said ions present in the alkaline solution are deposited as metal on the surface of the electrode by redox reaction with another metal present in the hydrogen storage alloy electrode.

10. The method for producing the hydrogen storage alloy electrode in accordance with claim 9, wherein the ions contained in said alkaline solution are the cobalt ions and the amount of said cobalt ions is equivalent to an amount of metal cobalt of 10 wt % or smaller of said hydrogen storage alloy.

11. The method for producing the hydrogen storage alloy electrode in accordance with claim 9, wherein the ions contained in said alkaline solution are the copper ions and the amount of said copper ions is equivalent to an amount of metal copper of 10 wt % or smaller of said hydrogen storage alloy.

12. The method for producing the hydrogen storage alloy electrode in accordance with claim 9, wherein the ions contained in said alkaline solution are the copper ions and the amount of said copper ions is equivalent to an amount of metal copper of 10 wt % or smaller of said hydrogen storage alloy, and said alkaline solution further contains tartaric acid or citric acid.

13. The method for producing the hydrogen storage alloy electrode in accordance with claim 9, wherein said immersing treatment is performed in a state where said alkaline solution is isolated from contact with oxygen gas.

14. The method for producing the hydrogen storage alloy electrode in accordance with claim 9, wherein said hydrogen storage alloy is an alloy represented by the general formula $LnNi_xA_y$, wherein Ln represents at least two members selected from lanthanide elements, and A represents at least one element selected from the group consisting of Mn, Co, Al, Fe, Si, Cr and Cu; and wherein $4.5 < x+y < 5.5$, $3.0 < x$ and $0 < y < 2.5$.

15. The method for producing the hydrogen storage alloy electrode in accordance with claim 9, wherein said hydrogen storage alloy is an alloy represented by the general formula $Zr_{1.2-a}Ti_aMn_wV_xNi_yM_z$, wherein M represents at least one element selected from the group consisting of B, Al, Si, Cr, Fe, Co, Cu, Zn, Nb, Mo, Ta and W; and wherein $0 \leq a < 1.2$, $0.1 \leq w \leq 1.2$, $0 \leq x \leq 0.4$, $0.8 \leq y \leq 1.6$, $0 < z \leq 1.2$, and $1.7 \leq (a+w+x+y+z) \leq 2.7$; and the main component of the alloy phase has a hexagonal crystal structure of $MgZn_2$ or a cubic crystal structure of $MqCu_2$.

16. The method for producing the hydrogen storage alloy electrode in accordance with claim 9, wherein said hydrogen storage alloy is an alloy containing Zr or Zr and Ti, and further containing an alloy phase containing Ln and Ni as its main component in 30 wt % or less, wherein Ln represents at least one member selected from lanthanide elements.

* * * * *